INVENTORS
KARL WOLFGANG VOGEL
HORST LACHMANN

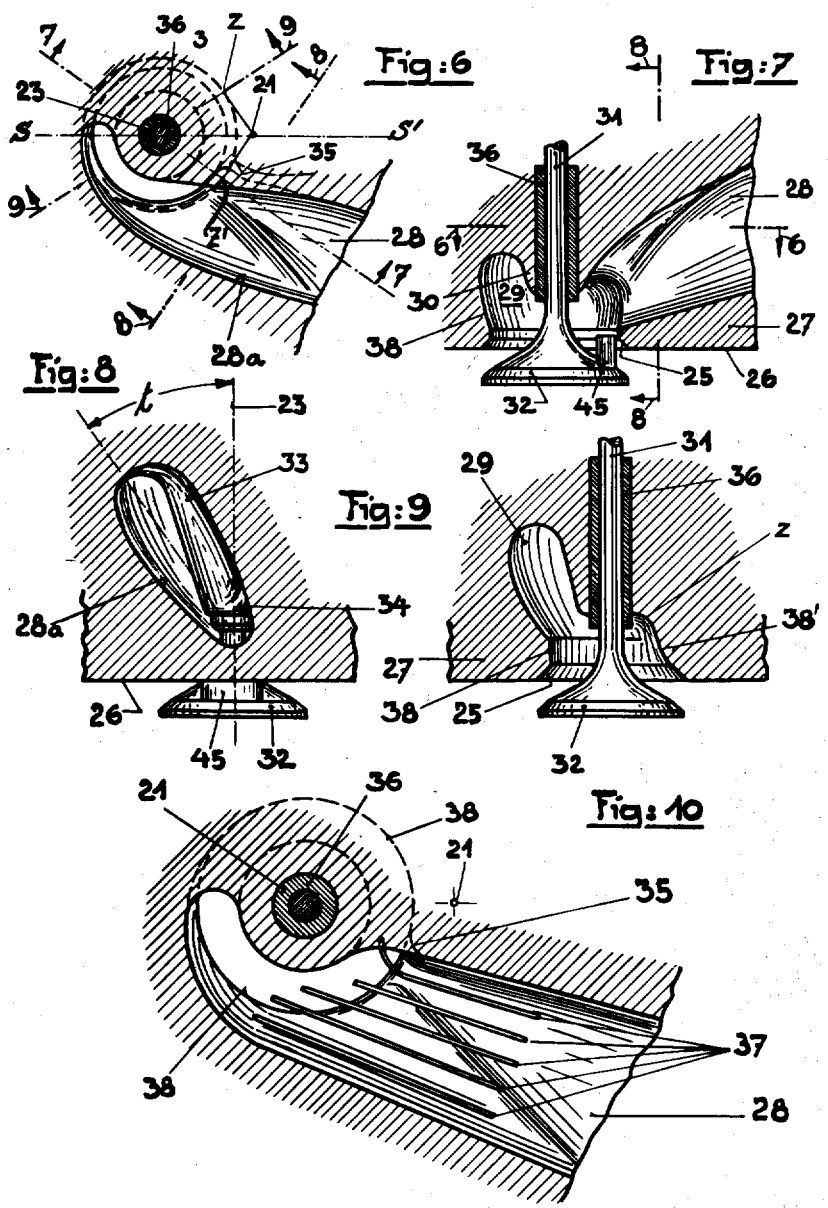

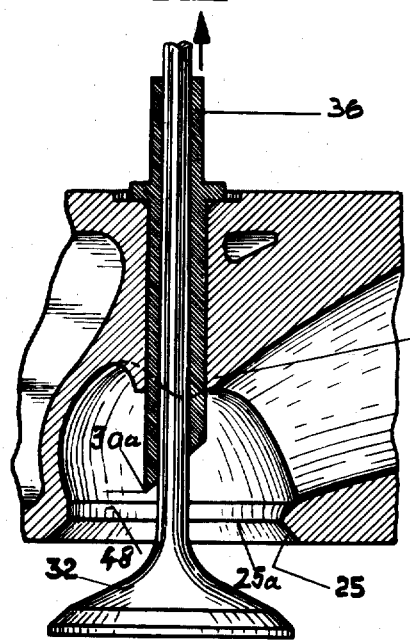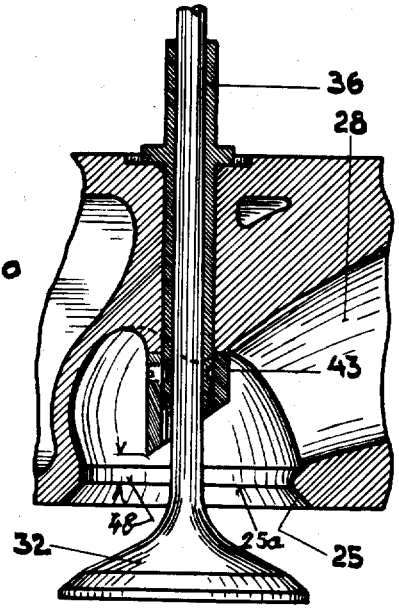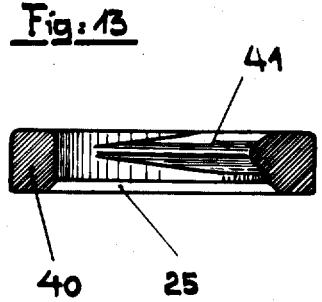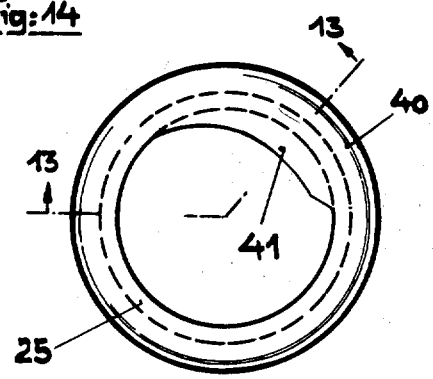

United States Patent Office 2,921,571
Patented Jan. 19, 1960

2,921,571
INTAKE PASSAGE FOR INTERNAL COMBUSTION ENGINES

Karl Wolfgang Vogel, Starnberg, and Horst Lachmann, Rosstal, Germany, assignors to Maschinenfabrik Augsburg Nurnberg A.G., Nurnberg, Germany Application March 7, 1958, Serial No. 719,948

Claims priority, application Germany July 31, 1954

9 Claims. (Cl. 123—188)

This invention relates to internal combustion engines of the type in which a swirl is imparted to the charge entering each cylinder, and more particularly to an engine in which the charge enters the cylinder under control of a poppet valve and the swirl is produced by characteristics of the conduit through which the charge is led to the valve opening. Among the objects of the invention are to increase the velocity of rotation of the charge in the engine cylinder, to provide a possibility of adapting the velocity of charge-rotation to the combustion process involved in any particular engine and/or to other engine conditions, and to obtain such advantages without accompanying disadvantages such as reduction in the amount of charge, high manufacturing costs, and inefficient operation.

When the charge is admitted to an engine cylinder through an eccentrically arranged inlet valve, rotation or swirl of the charge within the cylinder can be created only by reason of an asymmetry (with respect to the common plane of the cylinder axis and the valve axis) of the charge flow-lines emerging from the valve opening. If the entire circumferential extent of such valve opening or gap is to be utilized to promote the existence of maximum charge in the cylinder, such asymmetry can only be effected by an oblique flow—i.e., a flow which at any point on the valve circumference deviates in direction from the valve radius. The most favorable direction of flow relative to the valve radius will be different at different points of the valve circumference, and a maximum velocity of charge-rotation will be obtained when, with respect to each single point of the valve circumference, the best possible direction of flow at that point is achieved.

As will be brought out more fully below, it is a characteristic of engines of the type with which this invention is concerned that there is a maximum angle, somewhat less than 90°, by which the horizontal velocity-component of gas emerging at any point of the valve circumference can depart from the projection of the valve radius through such point. In most engines, such characteristic results in the fact that gas emerging over one segment of the valve circumference opposes the desired swirl in the cylinder. Such segment, which is a relatively small fraction of the entire valve-circumference, will lie in the general region between the valve-axis and the cylinder-axis but will be offset from the common plane of those axes in a direction opposite to that of the desired swirl in the cylinder.

An engine embodying my invention in its preferred form is characterized by the fact that the charge enters a chamber above the valve from an approach passage of elongated cross-section the major axis of which is so inclined to the plane of the valve seat that while the lower part of the terminal portion of the passage is directed generally radial of the valve above the particular segment above referred to the upper portion is directed generally tangentially of the chamber on that side thereof remote from the common plane of the axes of the cylinder and valve. Desirably, at least the terminal portion of the approach passage is of ovoidal cross-section, its radially directed lower part being narrower than its tangentially directed upper part.

The chamber above the valve is formed to provide two channels which extend circumferentially about the valve stem in opposite directions from the outlet of the approach passage. One of such channels has both a greater circumferential extent and a greater average cross-sectional area than the other, and is so arranged as to receive that part of the charge which emerges tangentially from the wider upper portion of the approach passage. The two channels meet each other at a point lying on the opposite side of the common plane of the valve axis and cylinder axis from the approach passage. The roofs of both channels slope helically toward the valve seat from the outlet of the approach passage to the point where the two channels meet. In the usual engine, where the eccentricity of the valve-axis exceeds the valve-radius, there will be two planes each of which contains the cylinder axis and is tangent to the valve-circumference. The point of tangency of one of such planes will lie between the ends of the segment where the emerging gases oppose the desired swirl in the cylinder; and the terminal portion of the approach passage desirably extends normal to that plane. Preferably, the point of meeting of the two channels constituting the chamber above the valve is located adjacent the point of tangency of the other plane.

In considering the effect, on charge rotation in the cylinder, of flow at any point on the valve circumference it may be assumed that the pressure drop in the valve opening will be essentially uniform throughout the circumference of the valve, that as a result both the linear velocity and the density of the gas emerging from such opening will be substantially the same at all points on the valve circumference, and that only the direction of the emerging gas will vary. It is therefore possible to represent the gas flow at points on the circumference of the valve by velocity vectors which have equal length but which may vary in direction; and such vectors will be employed in the following more detailed description, from which objects and features of the invention in addition to these set forth above will become apparent.

In the accompanying drawings, which assume that the cylinder is vertical and closed at its upper end:

Fig. 6 is a horizontal section through the cylinder head on the line 6—6 of Fig. 7;

Fig. 7 is a vertical longitudinal section through the approach passage on the line 7—7 of Fig. 6;

Fig. 8 is a vertical section transverse to the approach passage on the line 8—8 of Figs. 6 and 7;

Fig. 9 is an axial section through the valve chamber on the line 9—9 of Fig. 6;

Fig. 10 is a view similar to Fig. 6 but showing the approach passage as provided with flow-directing elements;

Fig. 11 is a fragmental axial section through a valve-boss showing a valve-guide having features which contribute to the accomplishment of our objects;

Fig. 12 is a view similar to Fig. 11 but showing a modified form of valve-guide;

Fig. 13 is an axial section through a valve seat provided with a flow-restricting bulge, the section being taken on the line 13—13 of Fig. 14; and Fig. 14 is a plan view of the valve seat shown in Fig. 13.

Figure 1:
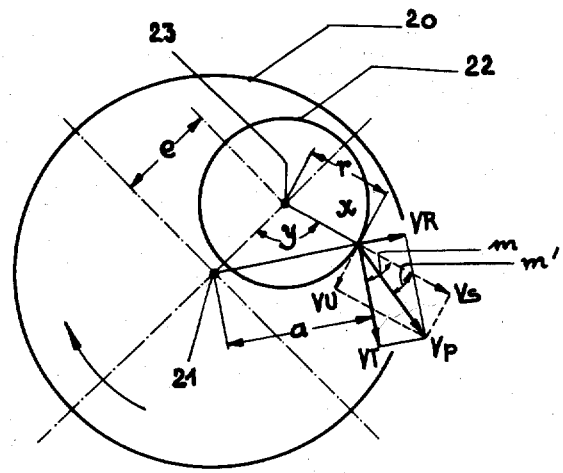
Fig. 1 is a diagrammatic plan view showing an inlet valve located in a cylinder head and eccentric to the cylinder.
Figure 2:
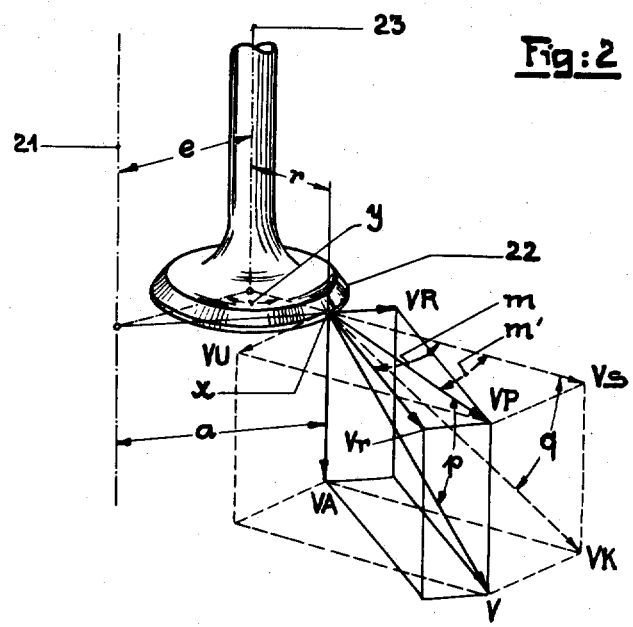
Fig. 2 is a perspective view of the inlet valve showing a flow vector and its resolution into significant components.

In Figs. 1 and 2, we have indicated the cylinder-circumference at 20, the cylinder axis at 21, the valve circumference at 22, and the valve axis at 23. As shown, the valve axis 23 is displaced from the cylinder axis by a distance $e$ which is greater than the valve-head radius $r$, as will be the case in most engines of this type. Figs. 1 and 2 illustrate a flow vector and components thereof for a point $x$ on the valve circumference. The location of point $x$ is determined by the angle $y$ between the valve radius through $x$ and the common plane 21—23 of the valve and cylinder axes. The distance of point $x$ from the cylinder axis is indicated by the reference letter $a$.

The flow vector $V$ for any point $x$ has two mutually perpendicular components, one $V_A$ which is parallel to the cylinder axis and the other $V_P$ which lies in the valve plane. $V_A$ determines the charge of the cylinder and is without effect on swirl. The vector $V_P$ is shown as having two pairs of mutually perpendicular components, one pair being $V_R$ and $V_T$ respectively radial and tangential of the cylinder and the other pair being $V_S$ and $V_U$ respectively radial and tangential of the valve.

Maintaining the assumption that the density of the gas passing through the valve opening will be uniform throughout the valve circumference, that portion of the entire swirl produced in the cylinder and attributable to gas emerging at point $x$ depends upon the angular momentum of such gas with respect to the cylinder axis 21 and is a function of the product of the tangential component $V_T$ and the distance $a$.

The maximum swirl-producing effect at any point on the valve-circumference will exist when $V_T$ equals $V_P$—that is, referring to Fig. 2, when the angle $m$ between the vector $V_T$ and the projected valve radius equals the angle $m'$ between the vector $V_P$ and such projected radius. In that condition, the emerging gas will possess no velocity component radial of the cylinder; in other words $V_R$ will be zero. This ideal condition can be attained only over a limited portion of the valve-circumference for the reason, noted above, that there is a maximum limit to the angle ($m'$) by which the vector $V_P$ can depart from the projected valve radius. This condition results from the fact that the emerging gas must always have a velocity component $V_S$ radial of the valve; and the angle $m'$ therefore has a maximum limit, $m'_{max}$. Over those portions of the valve circumference where the existence of such limit on the size of angle $m'$ prevents $V_P$ from coinciding with $V_T$, the maximum swirl-producing effect will exist when the projection of $V_P$ into the desired direction of rotation—i.e., the direction of vector $V_T$—will deviate as little as possible from the direction perpendicular to the radius from the cylinder axis. In that way, the undesired component $V_R$ radial of the cylinder will be a minimum.

Figure 3:
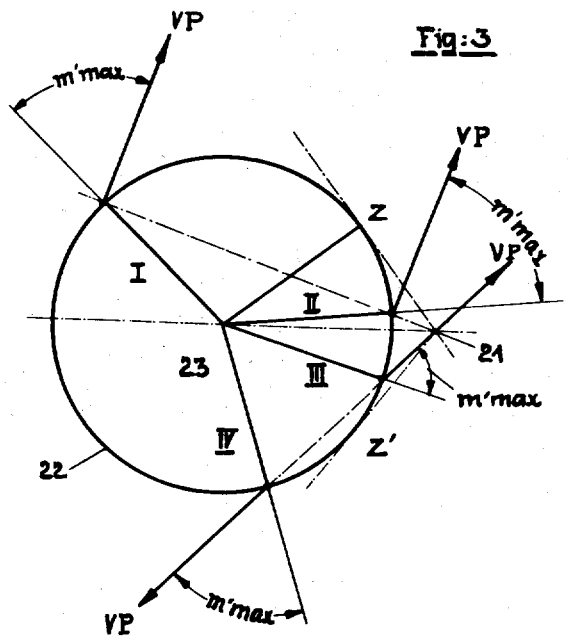
Fig. 3 is a diagrammatic plan showing the horizontal vector-components at different points on the valve circumference.
Figure 4:
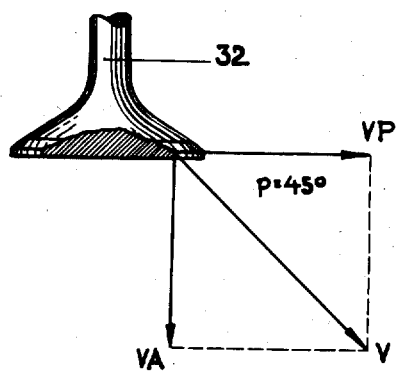
Fig. 4 is a section through the inlet-valve head on a vertical plane containing a non-radial flow vector.

Fig. 3 shows positions of the point $x$, respectively at the ends of radii I, II, III, and IV, where limiting conditions exist. The vector $V_P$ associated with each of those radii makes an angle $m'_{max}$ with the projected radius. For each of radii I and II the vector $V_P$ is perpendicular to the cylinder radius in the desired (clockwise) direction, but the vectors lie on opposite sides of the projected radii. For radius III, $V_P$ extends through the cylinder axis 21, and for radius IV the rearward projection of $V_P$ extends through the cylinder axis. As in the case of the vectors $V_P$ for radii I and II, the vectors for radii III and IV lie on opposite sides of the projected radii.

It may be noted that one of the tangents to the valve circumference 22 from the cylinder axis 21 will touch such circumference at a point Z between the radii I and II and that the other such tangent will touch the circumference 22 at a point Z' between the radii III and IV. Radii III and IV delimit that segment of the valve circumference where the emerging gases oppose swirl in the desired direction.

It can be shown that the aggregate of all vectors $V_P$ will have a maximum effect in producing swirl in the desired direction if the angle $m'$ is zero at point Z, increases progressively to maintain perpendicularity between $V_P$ and the cylinder radius to point $x$ as such point moves clockwise along the valve seat, attains its maximum value $m'_{max}$ at radius II, remains at that maximum to point Z', reverses its sign at point Z' while retaining the absolute size $m'_{max}$, remains at the reversed maximum to radius I, and then progressively decreases to zero at point Z to maintain perpendicularity between $V_P$ and the cylinder radius to $x$. It is of course impossible in practice to obtain at point Z' an abrupt reversal of the angle $m'$ from its maximum at one sign to its maximum at the other sign. For that reason, and also because gas emerging from the valve seat between radii III and IV opposes swirl in the desired direction, it may be advisable to provide means such as a blocking element which will tend to inhibit the emergence of gas in that region.

Figure 5:
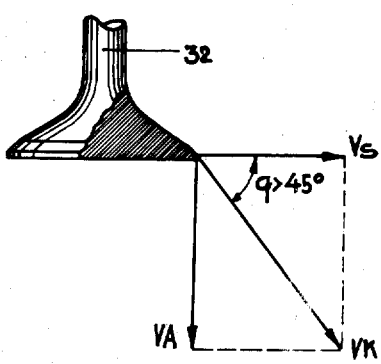
Fig. 5 is an elevation of the inlet valve head in partial section on an axial plane of the valve.

As previously set forth, the two components $V_P$ and $V_A$ of the vector $V$ which lie respectively in the valve-seat plane and perpendicularly to such plane affect, respectively, the swirl and the charge in the cylinder. The relative magnitudes of the vectors $V_P$ and $V_A$ is determined by the angle $p$ between the velocity vector $V$ and its projection $V_P$ into the valve-seat plane. A decrease in the size of this angle increases $V_P$ (and $V_T$), thus increasing the swirl, and decreases $V_A$, thus reducing the charge. Conversely, an increase in the angle $p$ will decrease the swirl and increase the charge. The maximum aggregate effect of the vector $V_P$ on both swirl and charge will be attained when the arithmetical sum of the components $V_P$ and $V_A$ is a maximum—i.e., when $p$ equals 45°. To obtain the maximum aggregate effect on both swirl and charge the angle $p$ should be as close as possible to 45° at all points in the valve circumference. The projection of the angle $p$ into the axial plane of the valve, which projection is indicated by $q$ in Figs. 2 and 5, is always larger than the angle $p$ itself, except at the point Z, where the axial plane of the valve contains the vector $V_P$ and the angle $p$ equals the angle $q$. Therefore, in order to obtain the most favorable swirl without unduly reducing the charge, the angle $p$ is always larger than 45°, except at point Z, and varies as a function of the angle $m'$ between $V_P$ and the projected valve radius. In other words, the larger angle $m'$ is, the larger angle $q$ should be.

A construction which provides for gas flow approaching the conditions indicated above as desirable is shown in Figs. 6 to 9. As there shown, the valve seat 25 is formed in the lower face 26 of the cylinder head 27, which contains the approach passage 28. Above the valve seat, the head 27 is recessed to provide a chamber 29 into which there projects from above a frusto-conical boss 30 slidingly receiving the stem 31 of the valve 32.

The following features of the construction are significant as contributing to attainment of the desired results:

a. As it nears the chamber 29 the passage 28 has a direction such that its projection into the plane of the valve seat is generally normal to that plane which contains the cylinder axis and is tangent to the valve seat at the point Z' of Fig. 3.

b. Adjacent the chamber 29, the passage has, in cross-section, an elongated ovoidal shape, the axis of the cross-section is inclined upwardly and outwardly, and the narrower end of the cross-section is at the bottom and located approximately above the point Z'.

c. The chamber 29 is formed to provide two branch channels between which the entering gases are divided, such channels extending in opposite directions around the boss 30 and having different circumferential extents.

d. The terminus of each branch channel is marked by a low point in the upper surface or roof of the chamber 29, such low point being located adjacent the point Z. From such low point the roof of each branch channel slopes helically upward and the cross-sectional area of each branch progressively increases to its point of juncture with the approach passage 28.

e. The walls of the approach passage 28 are so faired into the walls of the chamber 29 as to favor delivery of a major portion of the entering gases to the branch channel of greater circumferential extent and delivery of the minor portion of such gases to the other branch.

Considering the construction of Figs. 6 to 9 in greater detail, the outward and upward inclination of the axis of the ovoidal cross-section of the passage 28 makes it possible for the relatively broad upper portion of such passage to be directed tangentially of the chamber 29 while the narrower lower portion is directed generally radially of such chamber. For best results, the angle $t$ (Fig. 8) between the cross-section axis and the vertical depends upon the relative degree of elongation of the cross-section, the narrower the cross-section, the greater the size of angle $t$. In practice, the angle $t$ may vary from about 15° to about 75°, but an angle of about 30° is usually preferred.

The outer wall 28a of the approach passage 28—i.e., the wall more remote from the cylinder axis—fairs smoothly into the outer wall of the chamber 29, as will be clear from Fig. 6, while the upper wall of the approach channel fairs smoothly into the roof of such chamber. The upper portion 33 of the inner wall of the approach passage fairs smoothly into the surface of the boss 30 on that side thereof remote from the common plane of the cylinder and valve axes, as will also be clear from Fig. 6. The lower portion 34 of the inner passage wall, however, fairs into the outer surface of the chamber 29, as indicated at 35 in Fig. 6. The upper wall or roof of the chamber 29 has its lowest point approximately above the point Z, where the second plane through the cylinder axis is tangential to the valve seat 25. From that low point, the roof of the chamber slopes upwardly in opposite directions circumferentially of the chamber 29.

As will be clear from Figs. 6 to 9, much of the outer wall of the larger and longer of the two branch channels constituting the chamber 29 lies radially outward beyond the periphery of the opening into the valve seat. The outward extension of such outer chamber wall is greatest at the point where it merges with the wall of the approach passage and decreases with the height of the chamber-roof until, at the lowest point of the roof, it disappears. Except for its fairing into the lower portion of the inner wall of the approach passage, the outer wall of the shorter and smaller branch channel does not extend outwardly beyond the opening into the valve seat.

To take full advantage of the shape of the outer wall of the chamber 29 in obtaining the greatest value for the angle $m'_{max}$, the boss 30 has a relatively large diameter so that it will force the incoming charge outwardly. This effect can be augmented by employing a valve stem of relatively large diameter, by extending a relatively large-diameter valve-guide bushing 36 below the boss 30, and/or by locating the lower end of the boss or the bushing relatively close to the plane of the valve seat. A similar effect can be produced by providing the approach passage (Fig. 10) with a set of flow-dividing and guiding vanes 37.

The magnitude of the angle $p$ (Fig. 2) will be affected by the slope of the lower portion 38 of the side wall of the chamber 29 above and adjacent the valve-seat 25. Over the greater portion of the valve-seat periphery where angles $m'$ and $p$ are to have their maximum values, such wall portion 38 may be generally vertical, as shown at the left in Figs. 7 and 9. Where, as is the case adjacent the point Z, the angle $m'$ is to be relatively small and the angle $p$ is to be near 45°, the surface above the valve seat may be shaped to favor a more flaring flow of the emerging gas. Thus, as indicated at 38' in Fig. 9, the surface above the valve seat may flare outwardly and downwardly adjacent the point Z. As another means of accomplishing the same effect, there is shown in Figs. 13 and 14 a valve-seat insert 40 provided between the radii I and II with a narrow bulge 41 the lower surface of which flares downwardly and outwardly.

The arrangement of the approach passage and the chamber above the valve favor creation of the flow characteristics indicated above as desirable. Thus, the momentum of the major portion of the gases discharged from the upper part of the approach passage will favor the existence of a maximum angle $m'$ of the desired sense between the radii IV and I of Fig. 3. Beyond radius I, the progressive constriction of the channel, coupled with the effect of the opposing gas streams meeting at point Z, will favor a progressive reduction of the angle $m'$. At point Z, the impact of the two streams upon each other tends to destroy all circumferential velocity of the gases and favor their emergence in a direction radially of the valve, as is desired. Beyond point Z, the momentum of the gases in the smaller channel will result in a progressive increase of the angle $m'$ in the desired sense. At and adjacent the point Z', the momentum of the gases in the lower part of the approach passage will tend to cause their head-on impingement on the valve stem, valve guide 36, or boss 30 and their diversion into the two channels, thus favoring suppression of gas-emergence in the region between the radii III and IV where emerging gases oppose the desired swirl.

From the above explanation, it follows that by dividing the gas stream entering the chamber 29 into two sub-streams of different volumes with the larger stream passing about the valve-axis in the desired direction of swirl and by varying the direction of flow at points in the circumference of the valve gap, the best possible swirl effect along with a satisfactory charge can be obtained.

To regulate the swirl and adapt it to a particular combustion process and to other engine conditions, this invention provides the following possibilities:

(1) The size of angle $m'_{max}$ and the extent of the valve circumference over which that angle is to exist can be changed by (a) changing the diameter of the valve stem, the boss 30, or the guide bushing 36, or by varying the distance between the lower ends of such elements and the plane of the valve seat;

(b) rendering the lower end of the guide bushing 36 asymmetrical, as by cutting its lower end obliquely (Fig. 11), and adjusting such bushing about its axis; or (c) adjusting a sleeve 43 (Fig. 12) provided on the projecting lower end of the bushing 36.

(2) The size of angles $p$ and $q$, which control the ratio between swirl and charge, can be changed by (a) utilization of different valve-seat inserts 40 having different narrowing bulges 41 or otherwise altering the inclination to the vertical of the outer chamber wall above the valve seat;

(b) changing the valve-lift; and (c) changing the conical angle of the valve seat.

(3) That portion of the valve gap (between radii III and IV) where the emerging gas opposes the desired swirl can be reduced or effectively eliminated by the use of a gap-occluding blocking element.

A blocking element such as just mentioned can be provided on the valve as shown at 45 in Figs. 7 and 8. Such a blocking element, which may have other forms and other mountings, is not broadly new in this invention; but through the use of other features of this invention it is possible to eliminate the swirl-opposing effect with blocking elements of substantially less circumferential extent than those previously used. Obviously, reduction of the extent of the blocking element is desirable, since the blocking element, by partially occluding the valve-gap, throttles the incoming charge.

The boss 30 employed in my engine is of preferably substantially greater diameter, and extends somewhat closer to the plane of the valve seat, than bosses of conventional engines. Desirably, the distance between the valve-seat plane and the lower end of the boss 30, or the lower end of a guide bushing projecting therebeyond, is less than one-fourth the diameter of the valve-seat, and most desirably less one-sixth of such diameter. The diameter of the lower end of the boss or guide bushing is preferably about two-fifths of the valve-seat diameter. The side surface of the boss 30 desirably flares outwardly and upwardly at a rather substantial angle to reach, at the highest point of the chamber 29, a diameter at least approximately equal to that of the valve-seat. The maximum breadth of the channel 28 should be between one-fourth and three-fourths of the length of the channel cross-section (Fig. 8), and is preferably about two-thirds of such cross-section length.

For the purpose of describing the invention and illustrating it in simple form, we have shown the valve-axis as parallel to the cylinder-axis and the eccentricity ($e$) of the inlet valve as exceeding its radius ($r$); but it is to be understood that the invention may find use in engines embodying a different orientation of the valve-axis and a different relation between such eccentricity and radius. It is believed that the above explanation is adequate to indicate the nature of any changes that might be desirable as a result of lack of parallelism between the axes of the valve and cylinder; but in most instances any departure of the axes from the parallel relation will be too slight to necessitate any substantial change.

In respect to the eccentricity of the inlet valve, we prefer that it not be less than about 18% of the cylinder diameter. Most desirably, the eccentricity should be from 20% to 25% of the cylinder diameter. The ratio between the eccentricity and the valve radius will affect the relation of the limiting positions shown in Fig. 3 and the precise manner in which the most desirable angle $m'$ varies throughout the valve-circumference; but so long as the eccentricity is greater than the valve-radius, the character of the changes in such angle as the point $x$ moves around the valve-circumference will not be altered. However, if the valve-radius equals or exceeds the eccentricity, the most desirable angle $m'$ will have the same sign at all points on the valve-circumference. Unless the valve radius exceeds the eccentricity by a certain ratio, which is dependent on the size of angle $m'_{max}$ and which is unlikely to be attained in practice, there will always be one segment of the valve-circumference at which the emerging gases will oppose swirl in the desired direction and another segment throughout which the angle $m'$ can be progressively varied to increase the swirl. By applying the principles of our invention as above explained, the flow of the emerging gases can be controlled to obtain the maximum swirl-producing effect under any conditions apt to be encountered in practice.

This application is a continuation-in-part of our application Serial No. 523,851, filed July 22, 1955, and now abandoned.

We claim as our invention:

1. In an internal combustion engine having a cylinder and a poppet inlet valve and cooperating valve seat located in the head of the cylinder, said valve being eccentrically disposed relative to the cylinder, a chamber in said head adapted to communicate with the cylinder through the valve seat, said valve having a stem projecting axially through said chamber, and an inlet passage communicating with said chamber through an opening lying on one side of the plane containing the axes of the cylinder and valve, said chamber being formed to provide two channels extending partially around said valve stem in opposite directions, said channels being of different circumferential extent and meeting each other on the opposite side of said plane from said opening, the channel of greater extent having an average cross-sectional area greater than that of the other channel.

2. The invention of claim 1 with the addition that said channels are of progressively decreasing cross-sectional area toward their point of meeting.

3. In an internal combustion engine having a cylinder and a poppet inlet valve and cooperating valve seat located in the head of the cylinder, said valve being eccentrically disposed relative to the cylinder, a chamber in said head adapted to communicate with the cylinder through the valve seat, said valve having a stem projecting axially through said chamber, and an inlet passage communicating with said chamber, said passage having a relatively narrow lower portion directed generally radially of said chamber and a relatively broad upper portion directed generally tangentially of said chamber, said chamber being formed to provide two channels extending from said passage around said valve stem in opposite directions and of different circumferential extents, the channel of greater circumferential extent receiving gases emerging from the relatively broad upper portion of said passage and the other channel receiving gases discharged from the relatively narrow lower portion of said passage.

4. In an internal combustion engine having a cylinder and a poppet inlet valve and cooperating valve seat located in the head of the cylinder, said valve being eccentrically disposed relative to the cylinder, a chamber in said head adapted to communicate with the cylinder through the valve seat, the radius of said valve being less than its eccentricity whereby there will be two planes both containing the cylinder axis and respectively tangent to the valve-periphery at points spaced therealong, an inlet passage communicating with said chamber and extending therefrom in a direction generally perpendicular to one of said planes, said chamber being formed to provide two channels extending from said passage in opposite directions around the chamber and meeting each other adjacent the point at which the other of said planes is tangent to the valve, said channels being of decreasing cross-sectional area toward their point of meeting and that one of said channels which passes between the axes of the valve and cylinder having a materially smaller average cross-sectional area than the other channel.

5. In an internal combustion engine having a cylinder and a poppet inlet valve and cooperating valve seat located in the head of the cylinder, said valve being eccentrically disposed relative to the cylinder, a chamber in said head adapted to communicate with the cylinder through the valve seat, a valve guide projecting into said chamber toward the valve seat, and an inlet passage offset from the common plane of the axes of the valve and cylinder, said inlet passage having an elongated ovoidal cross-section the axis of which slopes upwardly and away from said plane, the narrower end of said cross-section being closer to the cylinder than the broader end, said passage having inner and outer walls, the inner wall being closer to said plane than the outer wall, said outer wall fairing into the peripheral wall of said chamber and the upper portion of said inner wall remaining in opposed relation to the outer wall and fairing into the side of said guide and defining the entrance into a first channel which constitutes a portion of said chamber and extends in one direction around said guide, the lower portion of the inner wall fairing into the peripheral wall of said chamber to define in part the entrance into a second channel which constitutes a portion of said chamber and extends in the opposite direction around said guide to meet said first channel, the entrance into said first channel having both a greater height and a greater cross-sectional area than the entrance into said second channel, both said channels decreasing in both height and area toward their point of meeting and said first channel having a materially greater length than the second channel.

6. In an internal combustion engine having a cylinder and a poppet inlet valve and cooperating valve seat located in the head of the cylinder, said valve being eccentrically disposed relative to the cylinder, a chamber in said head adapted to communicate with the cylinder through the valve seat, a boss projecting into said chamber toward said valve seat, said valve having a stem slidably received in said boss, an inlet passage communicating with said chamber through an opening in the side wall thereof, said chamber being formed to provide two channels extending from said opening partially around said boss in opposite directions, one of said channels having a greater circumferential extent than the other, and a flow-directing element adjustably mounted adjacent the lower end of said boss.

7. The invention of claim 6 with the addition that said flow-directing element surrounds said valve-stem, is assymmetrical, and is angularly adjustable about the axis of the valve stem.

8. The invention of claim 6 with the addition that said flow-directing element surrounds said valve stem and is adjustable longitudinally thereof.

9. In an internal combustion engine having a cylinder and a poppet inlet valve and cooperating valve seat located in the head of the cylinder, said valve being eccentrically disposed relative to the cylinder, a chamber in said head adapted to communicate with the cylinder through the valve seat, valve guiding means projecting downwardly into said chamber, said valve having a stem projecting axially through said valve guiding means, and an inlet passage communicating with said chamber, said passage having a lower portion directed generally radially of said chamber and an upper portion directed generally tangentially of said chamber, said chamber being formed to provide two channels extending from said passage around said valve stem in opposite directions and of different circumferential extents, the channel of greater circumferential extent receiving gases emerging from the upper portion of said passage and the other channel receiving gases discharged from the lower portion of said passage, the distance between the lower end of the valve guiding means and the plane of the valve seat being less than one-fourth the diameter of the valve seat.

References Cited in the file of this patent

UNITED STATES PATENTS

| | | |
|---|---|---|
| 1,812,262 | Gardner et al. | June 30, 1931 |
| 1,993,155 | Faber | Mar. 5, 1935 |
| 2,469,448 | Barber | May 10, 1949 |

FOREIGN PATENTS

| | | |
|---|---|---|
| 465,261 | Great Britain | May 4, 1937 |
| 603,054 | Great Britain | June 8, 1948 |
| 850,967 | Germany | Sept. 29, 1952 |
| 888,036 | Germany | Aug. 27, 1953 |